United States Patent [19]
Christensen

[11] Patent Number: 5,095,882
[45] Date of Patent: Mar. 17, 1992

[54] CLEANABLE AIR-TO-AIR COOLING SYSTEM

[75] Inventor: Steven S. Christensen, Livermore, Calif.

[73] Assignee: Paccar Inc., Bellevue, Wash.

[21] Appl. No.: 529,968

[22] Filed: May 29, 1990

[51] Int. Cl.⁵ .............................................. F02B 29/04
[52] U.S. Cl. .................................... 123/563; 60/599; 165/95
[58] Field of Search ........................ 123/563; 60/599; 165/95, 145, 140

[56] References Cited

U.S. PATENT DOCUMENTS

| | | | |
|---|---|---|---|
| 4,095,646 | 6/1978 | Granetzke | 165/95 X |
| 4,666,531 | 5/1987 | Minard | 165/95 X |
| 4,987,741 | 1/1991 | Moser | 60/599 |

Primary Examiner—Leonard E. Smith
Attorney, Agent, or Firm—Flehr Hohbach Test Albritton & Herbert

[57] ABSTRACT

An apparatus for a motor vehicle cooling system, comprising an aftercooler for cooling turbocharged air entering an engine of the motor vehicle. A radiator is provided for cooling fluid circulating in the engine. The radiator is aligned substantially in series with the after cooler. A spacer is connected between the after cooler and the radiator. Trap doors are provided in the spacer for accessing the after cooler and radiator.

8 Claims, 4 Drawing Sheets

CLEANABLE AIR-TO-AIR COOLING SYSTEM

TECHNICAL FIELD

The present invention relates generally to air-to-air cooling systems, primarily in vehicles with a turbocharging device. More specifically, the present invention relates to air-to-air cooling systems having an aftercooler placed in front of the radiator.

BACKGROUND ART

Referring to FIG. 1, a perspective view of an after cooler-radiator arrangement 30 of the prior art is shown. The physical relationship of an after cooler and a radiator assembly with respect to an engine as a whole is generally described in the detailed description of the preferred embodiment, below. It is important to recognize, with the assembly of FIG. 1, that the aftercooler 31 and radiator assembly 32 are placed one on top of the other such that they receive intake air in parallel. This configuration is to be distinguished from a serial arrangement, in which one unit is placed behind another unit such that air passes through one before the other, i.e., through the after cooler first and then through the radiator assembly or vice versa.

A shortcoming of the arrangement of FIG. 1 is that there is only a finite amount of space available at the front of a car or truck cab for installation of cooling system components. In a parallel configuration the finite amount of space must be split between the radiator assembly 32 and the aftercooler 31. This space limitation may result in cooling system heat exchangers that are of insufficient size to meet heat transfer requirements.

Although the arrangement of FIG. 1 may result in undersized heat transfer components, it is a desired configuration because it allows for easy cleaning. It is quite often the case that the radiator assembly 32 and after cooler 31 become clogged with bugs, plastics, tar, dirt, airborne debris etc, especially on refuse trucks. A parallel arrangement provides easy access to both the aftercooler 31 and the radiator assembly 32 whereby a high pressure water or air hose or similar cleaning device may be used to clear both components.

Referring to FIG. 2, a perspective view of a serial aftercooler/radiator assembly 40 is shown in which the aftercooler 41 and radiator assembly 42 are mounted directly to each other so that no gap is created between the two. This configuration necessitates the disassembly and removal of one, if not both, of the aftercooler 41 and radiator 42 for cleaning and servicing.

SUMMARY OF THE INVENTION

In view of the above shortcomings of the prior art, it is an object of the present invention to provide an after cooler and radiator assembly in a serial arrangement, thereby providing efficient use of space available at the front of a vehicle.

It is yet another object of the present invention to provide an aftercooler and radiator assembly in a serial arrangement to provide larger heat transfer for higher output engines within given vehicle space limitations.

It is another object of the present invention to provide an aftercooler and radiator assembly which is readily cleanable and does not require disassembly or removal of the aftercooler or the radiator from the vehicle for cleaning purposes.

The attainment of these and related objects may be achieved through use of the novel cleanable air to air cooling system herein disclosed. A cleanable air to air cooling system in accordance with this invention has an aftercooler for cooling turbocharged air entering an engine of a motor vehicle. A radiator is provided for cooling fluid circulating in the engine. The radiator is aligned substantially in series with the aftercooler. A spacer is connected between the aftercooler and the radiator. Trap doors are provided in the spacer to permit access to the aftercooler and radiator.

The attainment of the foregoing and related objects, advantages and features of the invention should be more readily apparent to those skilled in the art, after review of the following more detailed description of the invention, taken together with the drawings.

DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENT

Figure 1:
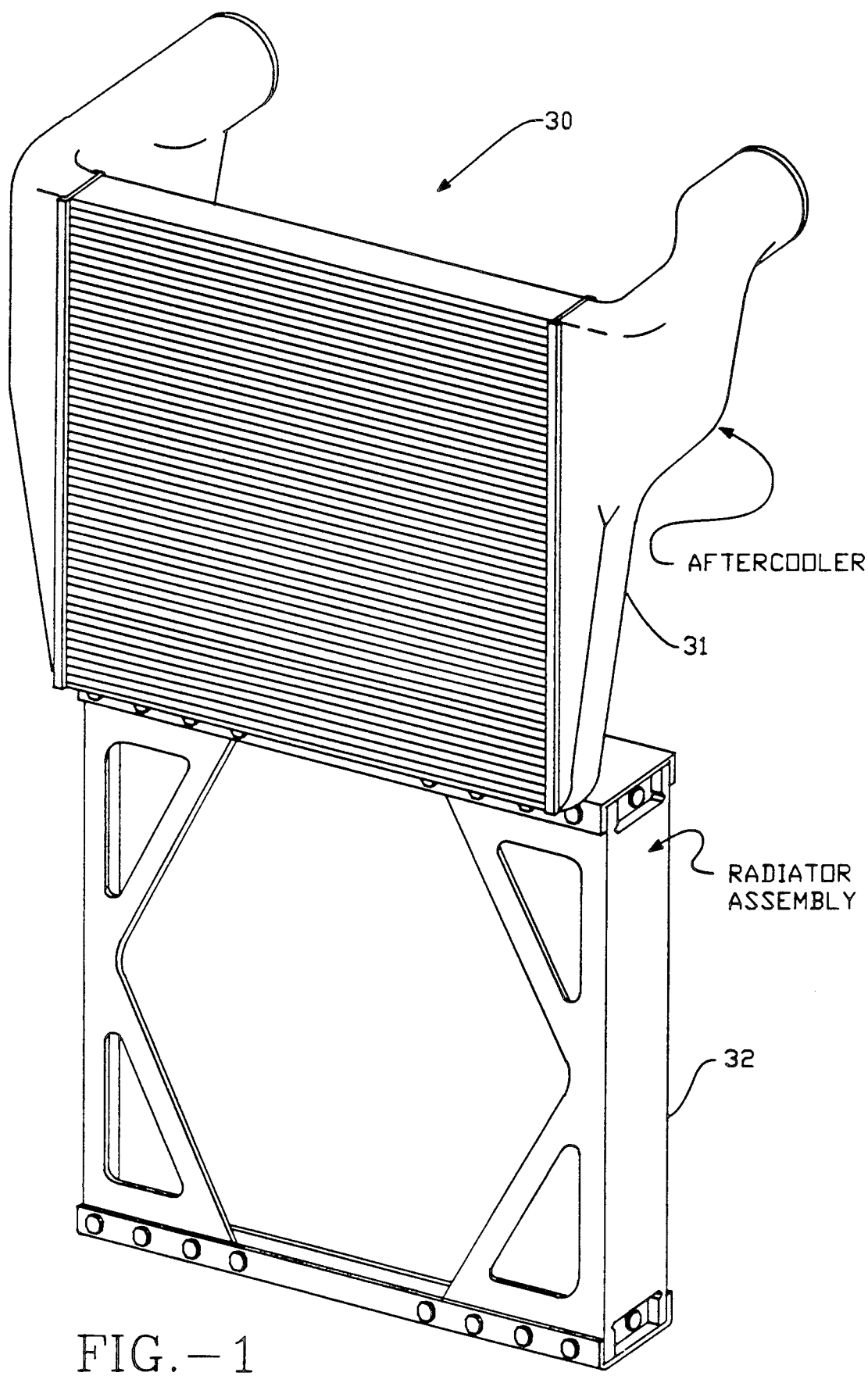
FIG. 1 is a perspective view of the parallel aftercooler and radiator assembly configuration of the prior art.
Figure 2:
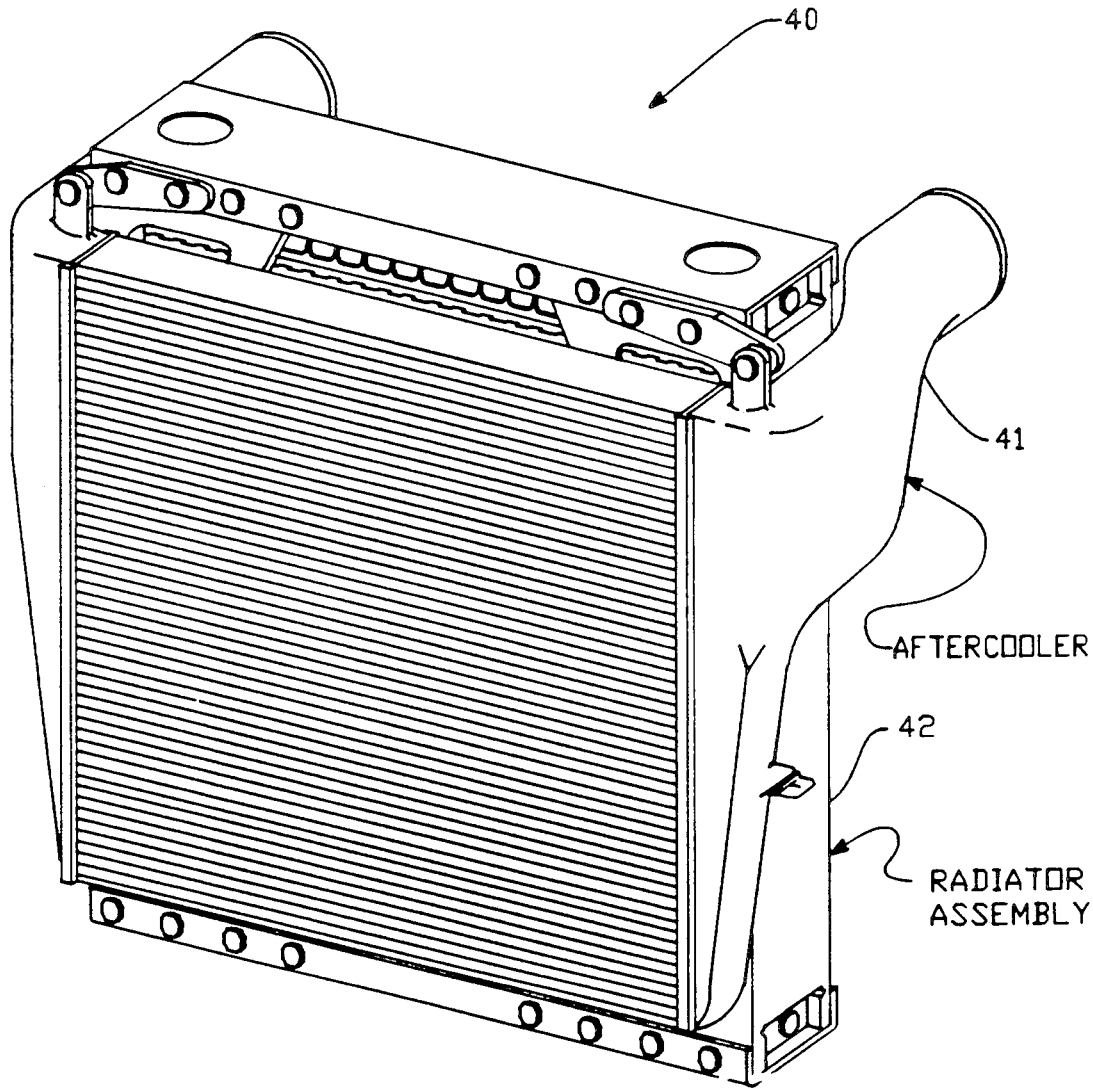
FIG. 2 is a perspective view of a serial radiator and aftercooler assembly with the after cooler mounted directly to the radiator of the prior art.
Figure 3:
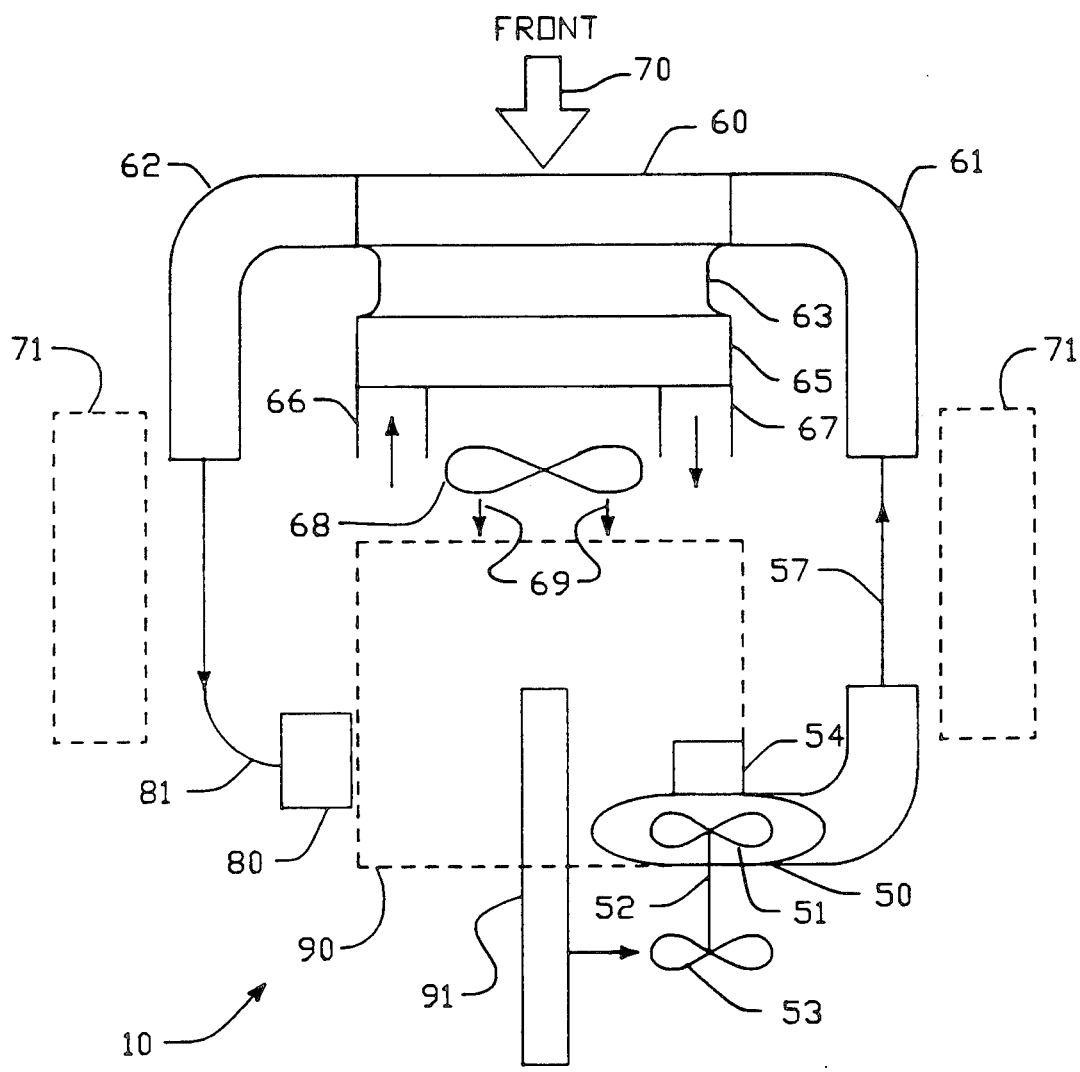
FIG. 3 is a diagrammatical plan view of the serial aftercooler and radiator assembly configuration of the preferred embodiment.

Referring to FIG. 3, a diagrammatical plan view of the aftercooler-radiator assembly 10 of the preferred embodiment is shown. FIG. 3 illustrates a truck engine generally referred to by block 90 indicated by dashed lines. The front tires are also shown by dashed lines. The other components, drawn as solid elements, represent parts of the air and engine cooling system. A basic premise for the preferred embodiment, is to provide an aftercooler 60 and a radiator 65 in such a manner to receive cooling air through the front of a truck in a serial fashion, i.e., air passes through aftercooler 60 and then through radiator assembly 65. The present invention provides a cooling system spacer 63 (hereinafter "spacer 63") which separates the aftercooler 60 from the radiator 65. The spacer 63 permits access to the space between the aftercooler 60 and the radiator 65 for cleaning, inspection and other related activities. This configuration provides sufficient space for air and coolant heat exchangers while at the same time providing easy vehicle cleaning and inspection.

Referring more closely to the arrangement 10 of the preferred embodiment, the engine 90 utilizes a turbo charger 50. The turbo charger 50 is basically an air compressor which compresses air received at intake 54. Turbo chargers are well known in the art and basically work as follows. A power turbine 53 is provided adjacent an exhaust pipe 91. Hot exhaust escaping through the exhaust pipe 91 turns the power turbine 53 which is connected through a common shaft 52 to a second compressor turbine 51 internal to the turbo charger 50. As the power turbine 53 is rotated it in turn rotates the compressor turbine 51, thereby causing the turbocharger 50 to pull in air at intake 54 and compress that air.

The air received at intake 54 is generally at ambient conditions. This air is received through the air cleaner or air filter arrangement of the vehicle. A standard turbo charger 50 increases the pressure and temperature of input air. Although the increased pressure, as will be discussed below, is desirable, the increased temperature is not. Therefore, the pressurized air output from the turbo charger 50 is input to an aftercooler 60 which cools the air via heat exchange to a lower temperature.

Focusing now on the aftercooler 60, the aftercooler 60 is basically an air-to-air heat exchanger. Air is passed from the turbo charger 50 through a transfer tube 57 to input manifold 61. The input manifold basically distributes input air flow for propagation of the hot air into the aftercooler core 60.

The aftercooler 60 is well known in the art and several configurations exist. A common aftercooler 60 configuration is a core matrix wherein tubes carrying air alternate with fins convecting heat away. An outlet manifold 62 is provided for receiving air from the aftercooler core 60. The output manifold 62 receives air from a plurality of tubes in the aftercooler core and converges these tubes into one singular tube for input to the intake manifold 80. Air coming out of the aftercooler 60, travels through transfer tube 81 to the engine intake manifold 80.

Other features of the preferred embodiment include a fan 68 for drawing cooling air through after cooler 60 and radiator 65. The direction of arrows 69 indicates the effect of fan 68 on air intake. Note, however, that the direction of the fan is to some extent arbitrary and it may blow in the other direction. The arrow 70 indicates the direction of air flowing into the front of a vehicle. Air flow (indicated by arrow 70) is also delivered through spacer 63 to the radiator 65 where it provides a similar cooling function for fluids circulating through the engine and passenger compartment. A coolant input 66 and coolant output 67 are indicated to illustrate flow of coolants through the radiator 65. This configuration permits the cooling air flow 70 to provide adequate cooling to turbocharged heated air (at aftercooler 60) and to coolant circulating through the engine 90 and passenger compartment of the vehicle.

Figure 4:
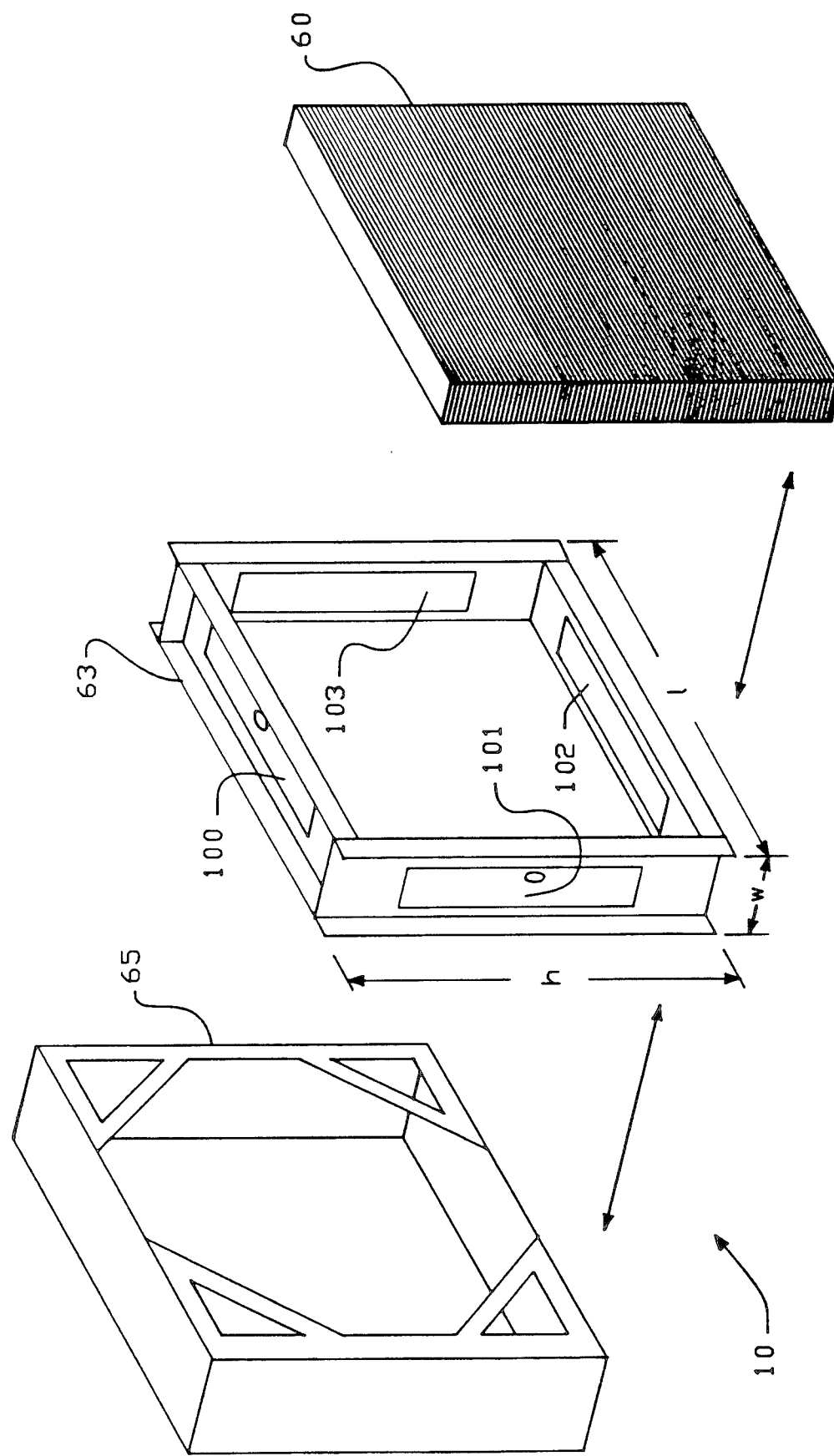
FIG. 4 is a perspective view illustrating the cooling system spacer of the preferred embodiment.

Referring to FIG. 4, a perspective expanded view of the after cooler-radiator assembly 10 of the preferred embodiment is shown. The aftercooler 60, as described with respect to FIG. 3, is represented generally by a three-dimensional block. The frame of the radiator assembly 65 is also illustrated. Located between the after cooler 60 and the radiator 65 is a cooling system spacer 63. As discussed with respect to FIG. 3, the spacer 63 permits the aftercooler 60 and radiator 65 to be in a serial arrangement for receiving inflow air, while at the same time providing cleaning, inspection, and easy installation of radiator 65, air aftercooler 60 and related components.

Spacer 63 is dimensionally consistent with the aftercooler 60 and the radiator assembly 65 along its height H and length L. The width, W, of spacer 63 is determined with the following constraints in mind. Trap doors 100-103 are provided for access within the spacer 63. The trap doors 100-103 and spacer 63 configuration are such that it should be relatively easy for a human to reach a hand through the trap doors 100-103 for extending a cleaning implement, e.g., a nozzle of a high pressured air or water hose, for cleaning the radiator 65 without having to remove the aftercooler 60 or radiator 65 from the vehicle. A suggested width of the spacer 63 is three to six inches. The trap doors 100-103 allow for access between components and clean out of any airborne debris that causes plugging and reduced cooling performance. Trap doors also provide for removal of debris and easy access during installation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for a motor vehicle cooling system, comprising:
   aftercooler means for cooling turbocharged air entering an engine of said motor vehicle, said aftercooler means being positioned in said vehicle too receive input cooling air;
   radiator means for cooling fluid circulating in said engine, said radiator means being aligned substantially in series with said aftercooler means;
   spacer means connected between said aftercooler means and said radiator means for spacing said after cooler means from said radiator means; and
   access means located in said spacer means for accessing said aftercooler means and said radiator means.

2. An apparatus for a motor vehicle cooling system, comprising:
   aftercooler means for cooling turbocharged air entering an engine of said motor vehicle, said aftercooler means being positioned in said vehicle to receive input cooling air;
   radiator means for cooling fluid circulating in said engine, said radiator means being aligned substantially in series with said aftercooler means; and
   spacer means connected between said aftercooler means and said radiator means for spacing said aftercooler means from said radiator means;
   trap door means for permitting access to space between said aftercooler means and said radiator means for entry into said interior and removal of material therefrom.

3. A method for arranging an aftercooler and a radiator in a motor vehicle, comprising the steps of:
   positioning aftercooler, for cooling turbocharged air entering an engine of said motor vehicle, to receive input air;
   substantially aligning radiator, for cooling fluid circulating in said engine, with said aftercooler so that said radiator receives input air in series with said after cooler;
   positioning said aftercooler from said radiator in said substantially serial alignment by mounting spacing means therebetween to form a space between said aftercooler and said radiator sufficient for insertion of a cleaning tool; and
   providing access to said space.

4. The method of claim 33 further comprises the step of:

shrouding said aftercooler and said radiator with a spacing means.

5. An apparatus for a motor vehicle cooling system having a radiator and an aftercooler, comprising:

aftercooler means for cooling air;

radiator means aligned substantially in series with said aftercooler means, said serially aligned aftercooler and radiator means being positioned in said motor vehicle to serially receive input cooling air;

spacer means connected between said aftercooler means and said radiator means for spacing said aftercooler means and radiator means; and access means located in said spacer means for accessing said aftercooler means and said radiator means, whereby said aftercooler means and said radiator means can be cleaned and otherwise serviced.

6. The apparatus of claim 5 wherein said spacer means is a shroud configured to direct cooling airflow from said aftercooler means to said radiator means.

7. The apparatus of claim 5 wherein said spacer means is a shroud configured to direct cooling airflow from said radiator means to said aftercooler means.

8. The apparatus of claim 5 wherein said access means comprises a plurality of trap doors which permit access to an interior of said aftercooler means and said radiator means for entry into said interior and removal of material therefrom.

* * * * *